United States Patent [19]
Lee et al.

[11] Patent Number: 5,599,640
[45] Date of Patent: Feb. 4, 1997

[54] ALKALINE FUEL CELL

[75] Inventors: Jai Y. Lee, Taejeon; Han H. Lee, Seoul; Jon H. Lee; Dong M. Kim, both of Taejeon, all of Rep. of Korea

[73] Assignee: Korea Advanced Institute of Science and Technology, Rep. of Korea

[21] Appl. No.: 516,328

[22] Filed: Aug. 17, 1995

[30] Foreign Application Priority Data

Aug. 17, 1994 [KR] Rep. of Korea ............... 94-20260

[51] Int. Cl.⁶ ........................... H01M 8/06; H01M 8/08
[52] U.S. Cl. ................. 429/46; 429/206; 429/27
[58] Field of Search .................. 429/27, 46, 206

[56] References Cited

U.S. PATENT DOCUMENTS

| | | | |
|---|---|---|---|
| 4,000,003 | 12/1976 | Baker et al. | 429/7 |
| 4,603,118 | 7/1986 | Staab | 502/101 |
| 4,628,010 | 12/1986 | Iwanciow | 429/19 |
| 4,833,046 | 5/1989 | Roy | 429/50 |
| 5,294,232 | 5/1994 | Sakairi et al. | 29/623.5 |
| 5,470,673 | 11/1995 | Tseung et al. | 429/44 |

OTHER PUBLICATIONS

"Hydrogen (Hydride)–Air Secondary Battery", J. Sarradin et al., Proc. of the 11th International Symposium at Brighton, Sep. 1978, *Power Sources* 7, pp. 345–351 (no month).

"Electrochemical Utilization of Metal Hydrides", Ketil Videm, Proc. of an International Symposium held in Gelio, Norway, Aug. 14–19, 1977, *Hydrides for Energy Storage* vol. 3, pp. 463–477.

"Performance of Air –Metal Hydride –Nickel Hybrid Battery", T. Sakai et al., The 35th Battery Symposium in Japan, Jun. 15–16, 1994, pp. 393–394, together with Statement of Relevancy.

*Primary Examiner*—Prince Willis, Jr.
*Assistant Examiner*—Carol Chaney
*Attorney, Agent, or Firm*—Burns, Doane, Swecker & Mathis

[57] ABSTRACT

The present invention relates to a fuel cell comprising an aqueous alkaline solution of electrolyte containing a hydrogen-releasing agent selected from the group consisting of $NaBH_4$, $KBH_4$, $LiAlH_4$, $KH$ and $NaH$, an oxygen electrode as a cathode and a hydrogen storage alloy electrode as an anode.

6 Claims, 5 Drawing Sheets

ALKALINE FUEL CELL

BACKGROUND OF THE INVENTION

1. Field of the Invention

The present invention relates to an alkaline fuel cell containing a hydrogen-releasing agent. More particularly, the present invention relates to a fuel cell or secondary cell which comprises an oxygen electrode as a cathode and a hydrogen storage alloy electrode as an anode in an aqueous alkaline solution of electrolyte containing a novel hydrogen-releasing agent.

2. Description of the Prior Art

Fuel cells produce current directly by the electrochemical reaction of hydrogen with atmospheric oxygen. Such cells are classified into alkaline fuel cells(AFC) and phosphoric acid fuel cells(PAFC) depending on the type of the electrolyte employed.

Generally, fuel cells of the type whose anode is directly supplied with hydrogen gas have been hitherto utilized because the electrochemical reaction has a high efficiency and can also occur at a normal temperature when hydrogen fuel is supplied as a gas. However, the hydrogen fuels have the disadvantages that their storage density is lower than that of other fuels, and thus their economical efficiency is low.

In the meantime, studies of producing fuel cells of the type which employ a hydrogen-containing hydrocarbon compound such as methane, propane, methanol, hydrazine, ammonia, and the like in place of the hydrogen gas in the solution of electrolyte, or of the type which supplies such a compound for the anode, have been developed. However, such fuel cells have the disadvantage that they require high temperatures (e.g., above 300° C.) for effective oxidation/reduction reactions of hydrogen/oxygen and that the reaction rate is slower. Thus, the reaction efficiency is degraded as compared with cells using hydrogen gas.

We, the inventors, have extensively studied approaches for overcoming these prior art disadvantages. As a result, we have discovered that where a hydrogen-releasing agent selected from the group consisting of $NaBH_4$, $KBH_4$, $LiAlH_4$, $KH$ and $NaH$ is added to an aqueous alkaline solution of electrolyte as hydrogen fuel, the electrochemical reaction rate is higher at a normal temperature compared with cells containing other hydrogen fuels.

SUMMARY OF THE INVENTION

It is therefore an object of the present invention to provide a fuel cell having a high electrochemical reaction efficiency and a good discharge capacity, which comprises a) an aqueous alkaline solution of electrolyte containing a hydrogen-releasing agent selected from the group consisting of $NaBH_4$, $KBH_4$, $LiAlH_4$, $KH$ and $NaH$, b) a hydrogen storage alloy electrode as an anode, and c) an oxygen electrode as a cathode.

Further objects and advantages of the invention will become apparent through reading the remainder of the specification.

DETAILED DESCRIPTION OF THE INVENTION

Figure 1:
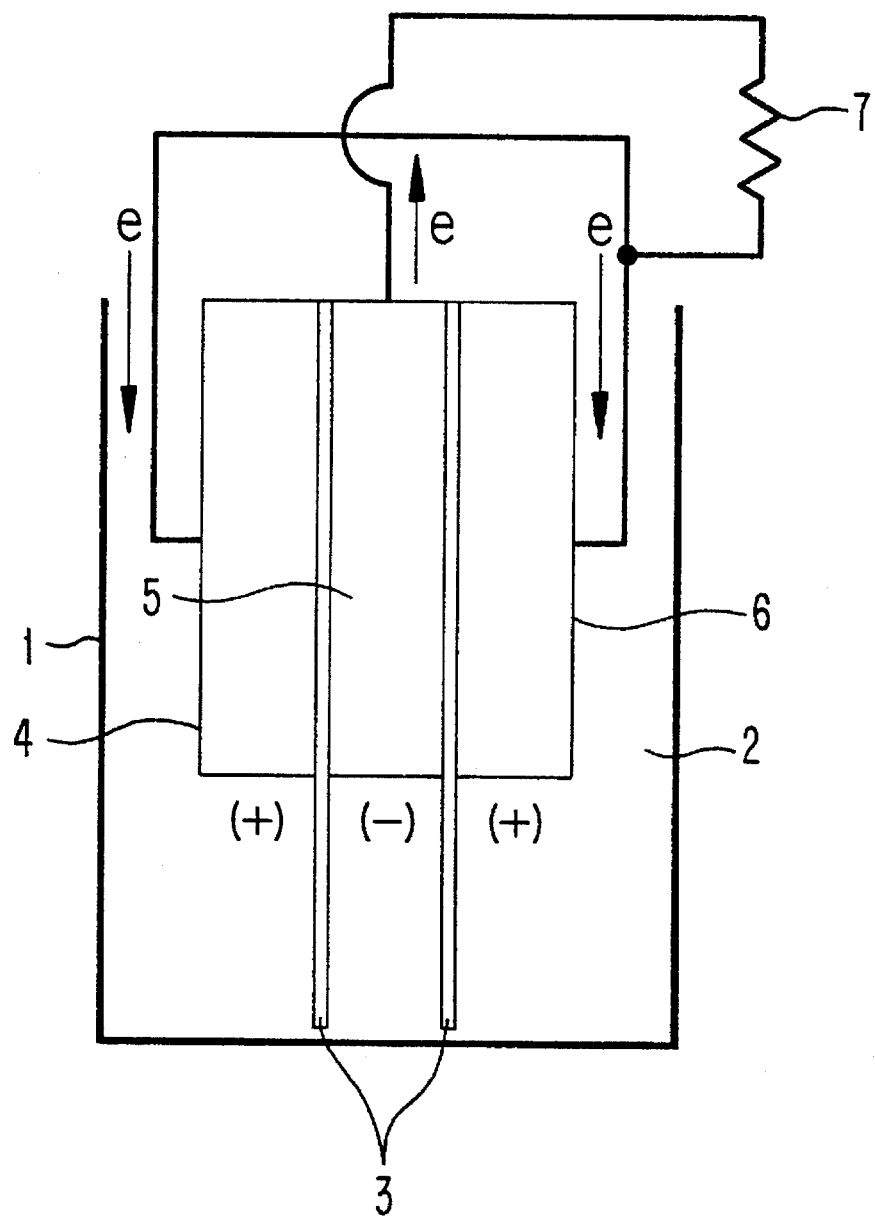
FIG. 1 shows a structure of a fuel cell according to the present invention.

According to the present invention, an alkaline fuel cell is provided which contains a hydrogen-releasing agent selected from the group consisting of $NaBH_4$, $KBH_4$, $LiAlH_4$, $KH$ and $NaH$. The reactions at the electrodes of the alkaline fuel cell containing the hydrogen-releasing agent are as mentioned below.

First, the added hydrogen-releasing agent releases hydrogen and electron in the aqueous solution of electrolyte through an electrochemical decomposition and oxidation by the hydrogen storage alloy catalyst. Where the hydrogen-releasing agent is $NaBH_4$, the following reactions will occur:

$$NaBH_4 \rightarrow Na^+ + BH_4^- \tag{1}$$

$$BH_4^- \xrightarrow{catalyst} BH_3^- + H \tag{2}$$

$$BH_3^- + OH^- \rightarrow BH_3OH^- + e^- \tag{3}$$

$$BH_3OH^- \xrightarrow{catalyst} BH_2OH^- + H \tag{4}$$

$$BH_2OH^- + OH^- \rightarrow BH_2(OH)_2^- + e^- \tag{5}$$

$$BH_2(OH)_2^- \xrightarrow{catalyst} BH(OH)_2^- + H \tag{6}$$

$$BH(OH)_2^- + OH^- \rightarrow BH(OH)_3^- + e^- \tag{7}$$

$$BH(OH)_3^- \xrightarrow{catalyst} B(OH)_3^- + H \tag{8}$$

$$B(OH)_3^- + OH^- \rightarrow B(OH)_4^- + e^- \tag{9}$$

$$B(OH)_4^- \rightarrow BO_2^- + 2H_2O \tag{10}$$

The above equations (2) to (10) can be represented by the following single equation:

$$BH_4^- + 4OH^- \rightarrow BO_2^- + 2H_2O + 4H + 4e^- \tag{11}$$

Where the hydrogen-releasing agent is $KBH_4$ or the others, similar decomposition reactions to the equations (2) to (10) will occur in the aqueous solution of electrolyte to produce hydrogen in the solution.

Hydrogen, which is generated by the above hydrogen-releasing agent, is stored in a hydrogen storage alloy anode as hydrogen storage materials, e.g., metal hydrides to supply the hydrogen fuel. The reaction involved can be represented by the equation:

$$M + XH \underset{\longrightarrow}{\overset{\text{reversible}}{\longleftarrow}} MHx + Q(cal) \quad (12)$$

wherein M represents a metal or an intermetallic compound (hydrogen storage alloy), and MHx represents a metal hydride.

Thus, the generation of hydrogen and electron in the alkaline solution containing a hydrogen-releasing agent, and the subsequent storage of the hydrogen in the hydrogen storage alloy can be represented by the equation (13):

$$1/4 XBH_4^- + XOH^- + M \xrightarrow{\text{hydrogen fuel}}$$

$$1/4 XBO_2^- + MHx + 1/2 XH_2O + Xe^- \quad (13)$$

Hydrogen which has been stored in this manner produces electrons by dehydrogenation, i.e., oxidation of the hydrogen storage alloy at the anode, as in the anode of nickel/metal hydride (Ni/MH) cell[see. equation (14); U.S. Pat. Nos. 3,874,928, 4,004,943 and 4,004,943, and Japanese Patent Application No. 62-296365].

$$MHx + XOH^- \underset{\longrightarrow}{\overset{\text{reversible}}{\longleftarrow}} M + XH_2O + Xe^- \quad (14)$$

In addition, the reduction reaction of hydrogen released from the hydrogen-releasing agent as shown in the following equation (15), and the electron-releasing reaction as in the following equation (16) can occur in the alkaline solution of electrolyte.

$$H + OH^- \rightarrow H_2O + e^- \quad (15)$$

$$BH_4^- + 8OH^- \rightarrow BO_2^- + 6H_2O + 8e \quad (16)$$

$$(X/8 BH_4^- + XOH^- \rightarrow X/8 BO_2^- + 3X/4 H_2O + Xe)$$

In the meantime, atmospheric oxygen fuel is supplied for the oxygen cathode to cause the reduction reaction of the following equation (17) at the interfaces between the electrode and the aqueous solution of electrolyte, and thus electrons are consumed.

$$O_2 + 2H_2O + 4e^- \rightarrow 4OH^- \quad (17)$$

$$(X/4 O_2 + X/2 H_2O + Xe^- \rightarrow XOH^-)$$

Thus, where the hydrogen-releasing agent is either $NaBH_4$ or $KBH_4$, the overall reaction of atmosphere/hydrogen storage alloy cell containing the hydrogen-releasing agent can produce electric energy by the following three electrochemical oxidation/reduction reactions.

$$X/4 BH_4^- + X/4 O_2 + M \rightarrow X/4 BO_2^- + MHx \quad (18)$$

$$X/4 O_2 + MHx \rightarrow M + X/2 H_2O \quad (19)$$

$$X/8 BH_4^- + X/4 O_2 \rightarrow X/4 H_2O + X/8 BO_2^- + \quad (20)$$

The theoretical voltage of the cell is 1.2 V.

As indicated in the above equations, $NaBH_4$ or $KBH_4$ hydrogen-releasing agent ultimately produces $B_2O_4$, which is present as ions in the aqueous solution of electrolyte. The accumulation of $B_2O_4$ in the aqueous solution degrades the efficiency of the cell. Therefore, $B_2O_4$ should be periodically removed from the cell by exchange of the alkaline solution of electrolyte.

The fuel cell of the present invention will be further illustrated hereinbelow with reference to FIG. 1.

The electrolyte which can be employed in the present invention may be an alkaline electrolyte 2 at pH>7, for example, KOH, NaOH, or the like. According to the invention, a hydrogen-releasing agent is added to the alkaline solution of electrolyte 2. The hydrogen-releasing agent is selected from the group consisting of $NaBH_4$, $KBH_4$, $LiAlH_4$, KH, and NaH. The hydrogen-releasing agent may be used preferably in an amount of 0.01 to 50.00% by weight on the basis of the total weight of the alkaline solution of electrolyte. When the amount of hydrogen-releasing agent used is less than the lower limit of the range, the amount of hydrogen to be released will be lowered, This degrades the efficiency of the cell. When the amount of hydrogen-releasing agent used is more than the upper limit of the range, the hydrogen-releasing agent is not dissolved in the alkaline solution, resulting in the formation of solid precipitates. This also degrades its utility and efficiency. In order to enhance the ionic conductivity of the electrolyte 2, for example, LiOH may be added to the alkaline solution of electrolyte in an amount of 0.01 to 0.1% by weight.

Oxygen electrodes 4 and 6 are made of materials selected so that oxygen can be easily engaged in an oxidation/reduction reaction on its surface. For example, such electrodes may include carbon electrodes, platinum-dispersed carbon electrodes, nickel electrodes, and the like which have a double or triple structure consisting of a hydrophilic side interfaced with the electrolyte 2 and a hydrophobic side interfaced with atmosphere.

The preferable hydrogen storage alloy 5 is one which can reversibly absorb and release hydrogen irrespective of the hydrogen storage capacity and has the properties of a fast hydrogenation reaction rate, a good stability in the electrolyte 2 and a long shelflife. Preferably, said alloys include, for example, $AB_5$ Misch metallic alloys, typically, Mn (Ni, Co, Al or Mn)$_5$, $AB_2$ Zirconium alloys, typically, $Zr_{1-x}N_xCr_{1-Y-Z-A-B}Mn_YFe_ZCo_AV_BNi$ (N≡Ti, Hf, $0 \leq X \leq 0.4$, $0 \leq Y, Z, A, B \leq 0.5$), $AB_2$ Titanium alloys, typically, $Ti_{2-x}Zr_xV_{4-y}Ni_y)_{1-z}Cr_zM'a'$ (x=0–1.5, y=0.6–3.5, z=0.01–0.2, M'=Al, Co, Mn or Fe, a'=0.01–0.1), and the like.

The aqueous solution of electrolyte provides an electrode/electrolyte interface by means of capillary action through the separator 3. It also acts as an ion conductor between the electrodes.

Figure 3:
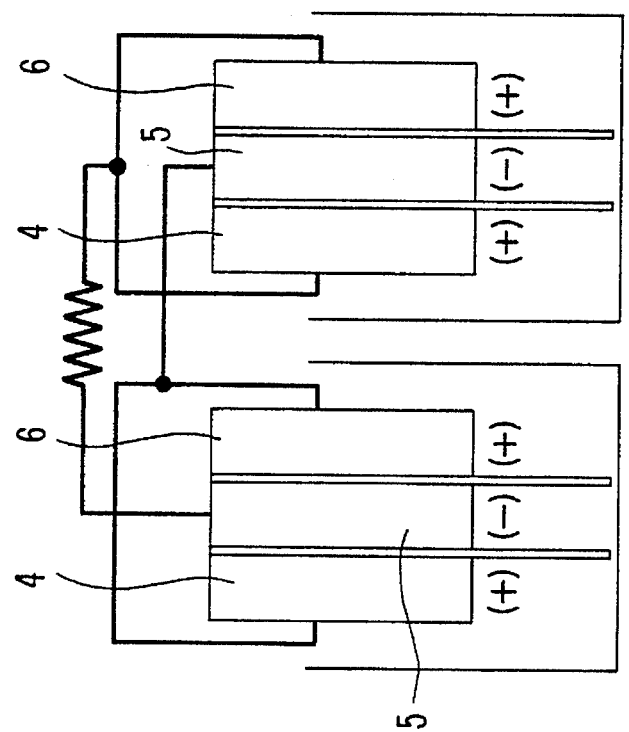
FIG. 3 shows a structure of connected-in-series fuel cells according to the present invention.
Figure 2:
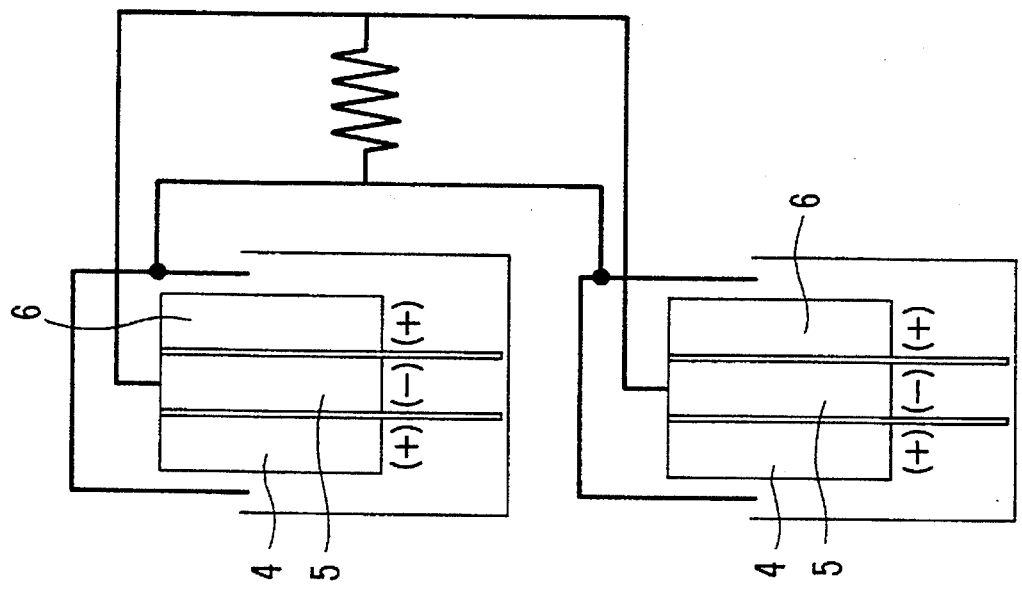
FIG. 2 shows a structure of connected-in-parallel fuel cells according to the present invention.

In order to obtain a large-sized cell, each of the unit cells can be connected in parallel or series, as shown in FIG. 2 and FIG. 3, respectively.

The cell of the present invention has a higher electrochemical reaction rate than those of the prior art fuel cells. Therefore, it can operate at a normal temperature and produce a large amount of energy due to its high energy density of 6,000 Ah/kg or more(for $NaBH_4$ or $KBH_4$). Where air is supplied to the oxygen electrode and the hydrogen-releasing agent is fed to the alkaline solution of electrolyte, the cell can produce electric current continuously. That is, the fuel can be to supplied very simply for the cell.

DESCRIPTION OF THE PREFERRED EMBODIMENTS

The present invention will be illustrated in greater detail by way of the following examples. The examples are presented for illustrative purposes only and should not be construed as limiting the invention, which is properly delineated by the claims.

EXAMPLE 1

An aqueous solution containing 1 g of $NaBH_4$ in 500 cc of 6M KOH was used. A $ZrCr_{0.8}N_{1.2}$ alloy was used as an anode. The hydrogen storage alloy electrode was obtained by melting the weighed amount of each pure metal under an argon atmosphere, mechanically pulverizing, and then mixing with an appropriate amount of copper or nickel powder and TEFLON powder. The resulting mixture was pressure-molded. The hydrogen storage alloy electrode was made in disc form, and had a size of 1 cm in diameter and 1 mm in thickness. The weight of the disc alloy electrode was 0.24 g. A platinum-dispersed carbon electrode (Pt/C) was used as a cathode. The Pt/C electrode was made by dispersing 5% by weight of platinum in VULCAN XC-72(purchased from ETEK; a carbon black). The hydrophobic/hydrophilic treatment was carried out as follows. The Pt/C powder and polytetrafluoroethylene were mixed in weight ratios of 70/30 for the hydrophilic side of the electrode, and 60/40 for the hydrophobic side of the electrode. The mixed powder were intimately mixed in distilled water by ultrasonic agitation, and rolled on a carbon paper. The rolled powder was covered by a carbon paper which was made by dispersing and coating 20% by weight of platinum in VULCAN XC-72 (purchased from ETEK) at a laboratory, and the moisture was removed by pressing, followed by drying at 120° C. in a nitrogen atmosphere. The reaction layer was attached with the carbon paper by pressure and calcined at the melting point of PTFE, i.e. 300° C. for one hour to obtain a specimen. The final pressure of the press was 2,000 KPa. The specimen had a diameter of 15 mm and a thickness of 0.2 mm.

Figure 4B:
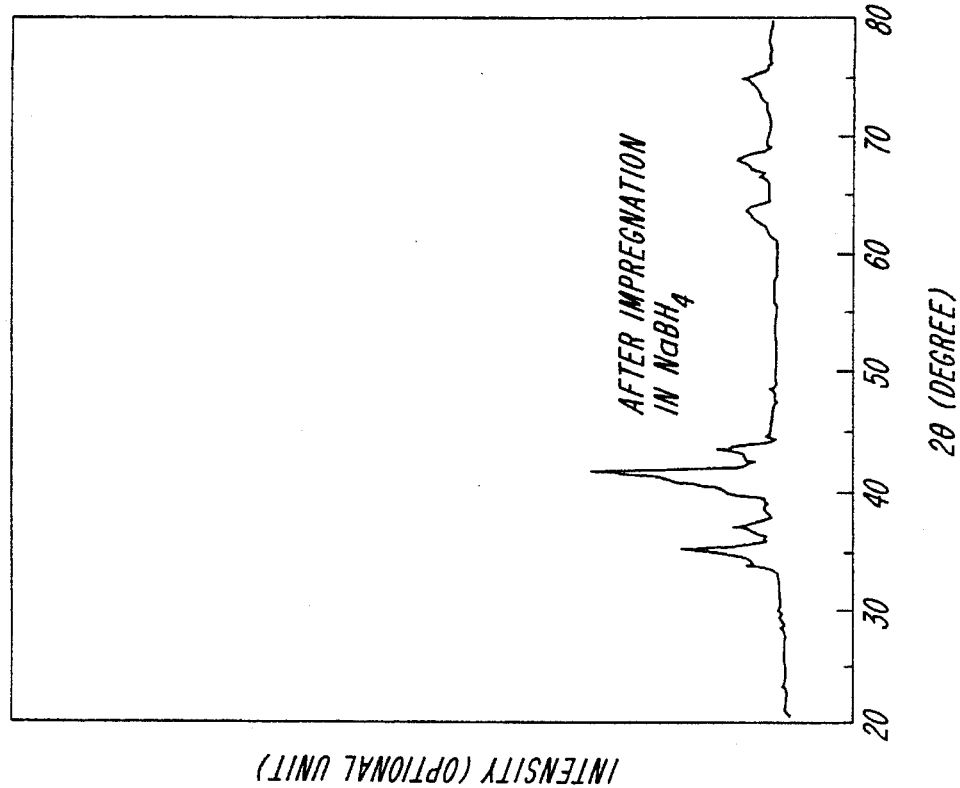
FIG. 4(B) shows an X-ray diffraction pattern of a pressure-molded hydrogen storage alloy electrode of FIG. 4(A) after the electrode is impregnated in the alkaline solution of electrolyte.
Figure 4A:
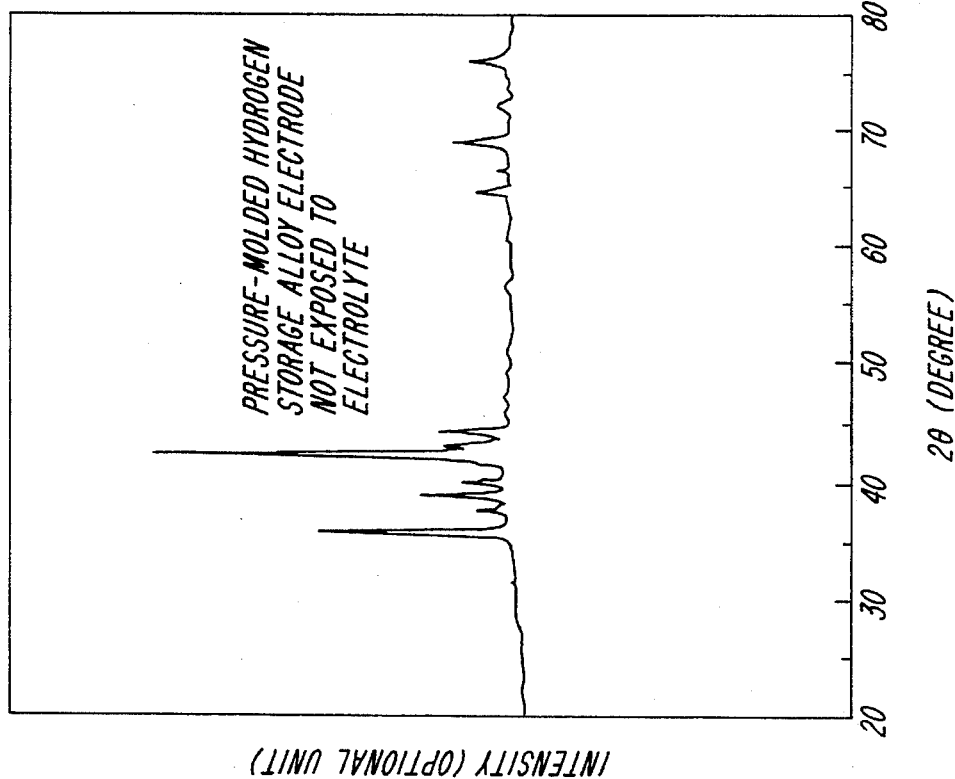
FIG. 4(A) shows an X-ray diffraction pattern of a pressure-molded hydrogen storage alloy electrode which is not exposed to the alkaline solution of electrolyte.

It was observed by an X-ray diffraction analysis that upon exposing the hydrogen storage alloy anode to the solution of electrolyte containing the hydrogen-releasing agent without any external treatment, the reaction at the alloy electrode caused a change from an intermetallic compound to a metal hydride by the action of the hydrogen-releasing agent added. The results are shown in FIG. 4. It can be seen from FIG. 4 that the hydrogen fuel could be supplied to the hydrogen storage alloy electrode without any treatment.

Figure 5:
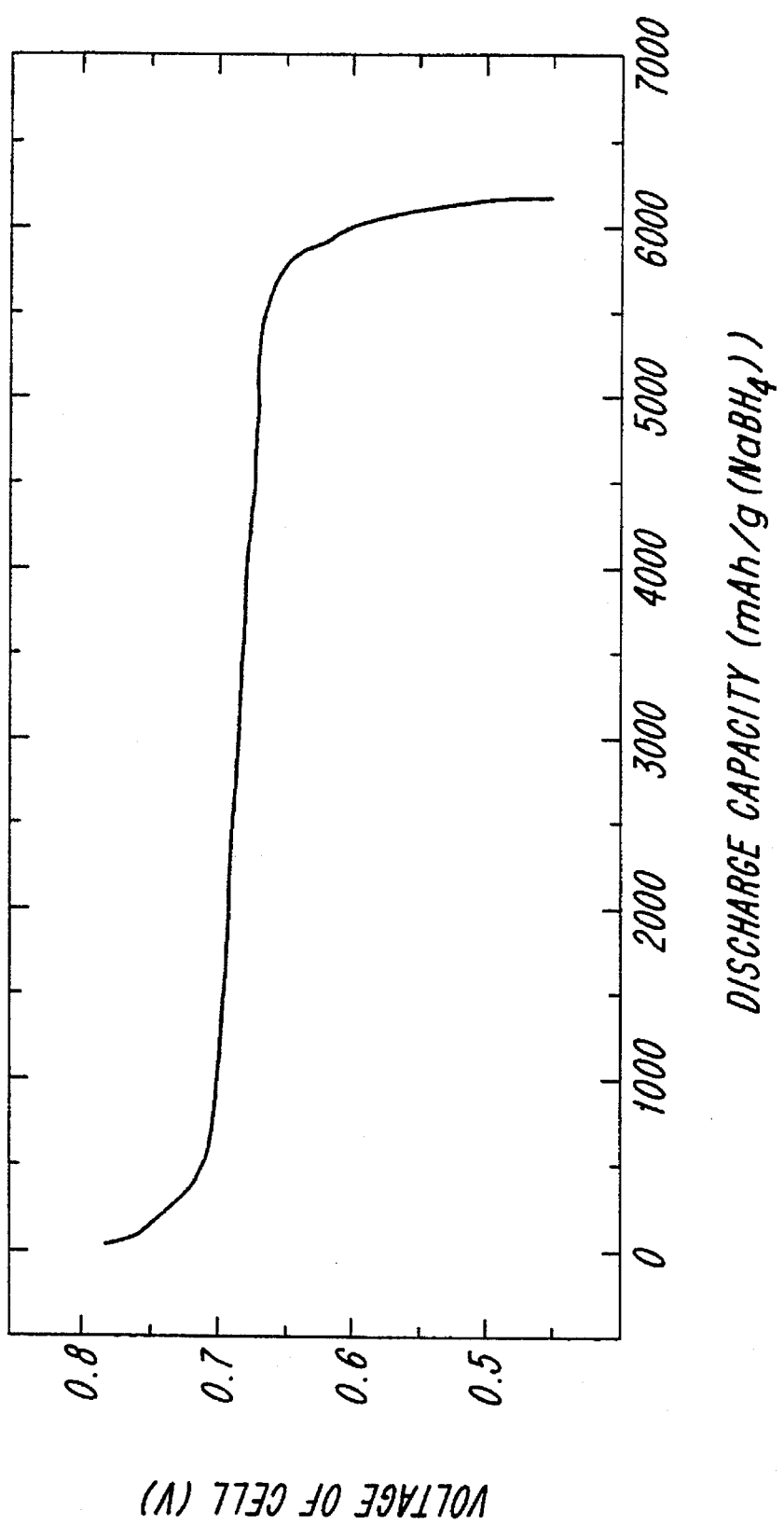
FIG. 5 shows a current discharge curve of a fuel cell containing a hydrogen-releasing agent according to the present invention.

After the hydrogen storage alloy absorbed hydrogen, the cell was discharged at 10 mA with measuring of its discharge voltage. The results are shown by a discharge curve in FIG. 5. It can be seen that the discharge voltage was about 0.7 V and that the overvoltage of about 0.3 was generated. Such overvoltage is mostly generated from the oxygen cathode. However, if pure oxygen gas, not air, is supplied to the oxygen cathode and the volume of oxygen to be supplied is increased, the overvoltage decreases. A glass tube for gas feeding was inserted into the rear side of the oxygen electrode, and the tube was connected with the pressurized oxygen cylinder. The flow rate of oxygen or air was controlled by a valve or a ventilator, respectively. Table 1 below shows the discharge voltage of the cell depending on the flow rate of either oxygen gas or air.

| flow rate of air (liter/min) | discharge voltage(V) | flow rate of oxygen (liter/min) | discharge voltage(V) | |
|---|---|---|---|---|
| 0 | 0.71 | 0 | 0.8 | |
| 0.1 | 0.73 | 0.1 | 0.84 | |
| 0.2 | 0.78 | 0.2 | 0.88 | |
| 0.5 | 0.85 | 0.5 | 0.95 | |
| 0.5 in excess | — | 0.5 in excess | — | the electrode destructed |

The discharge capacity was about 6,000 mAh per gram of $NaBH_4$.

EXAMPLE 2

Figure 6:
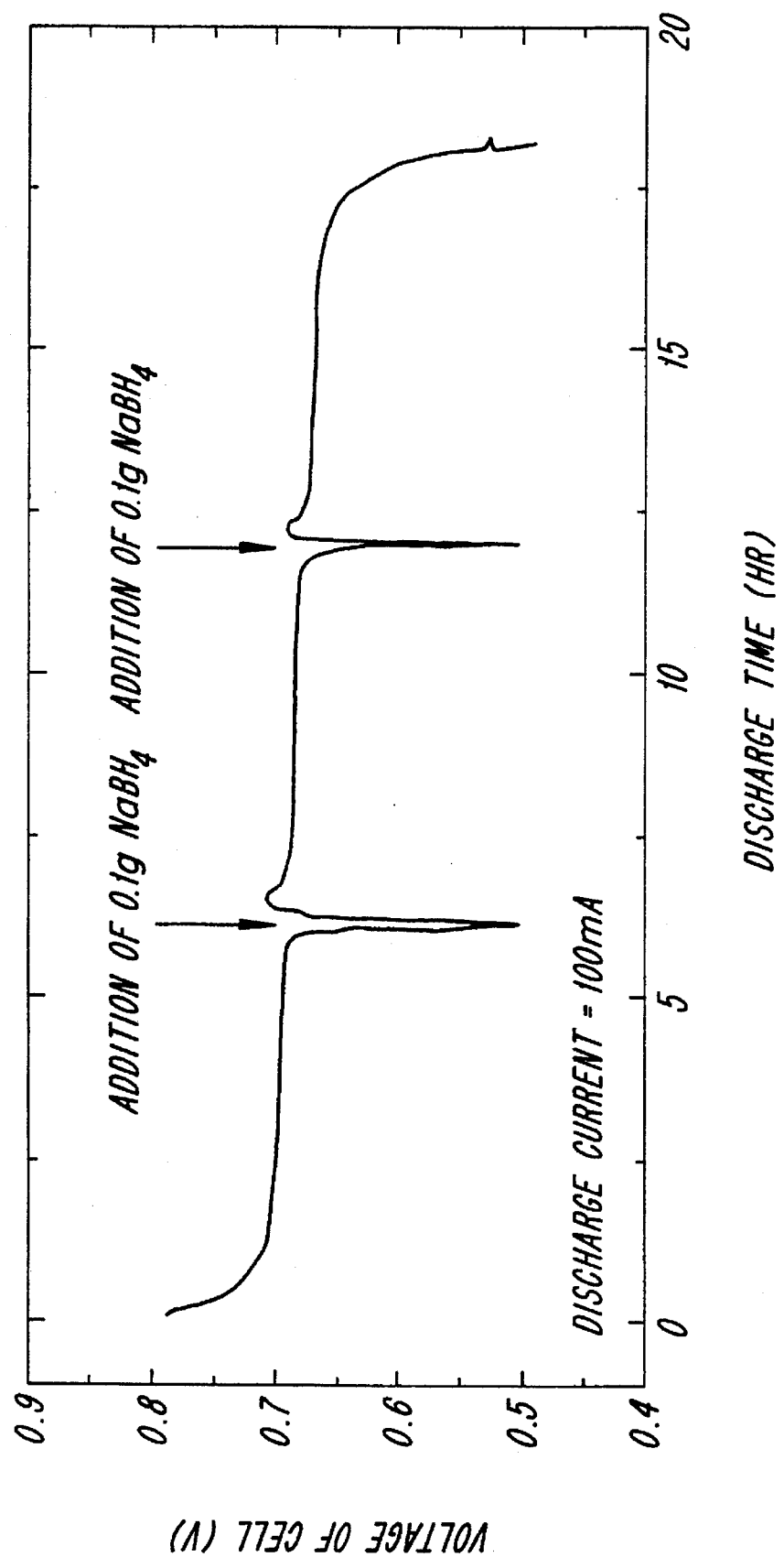
FIG. 6 shows a current discharge curve of a fuel cell according to the present invention, where the hydrogen-releasing agent is intermittently added to the fuel cell.

In this example, the same platinum-dispersed carbon electrode as described in Example 1 was used as a cathode. A $ZrVNi_{1.1}$ alloy was used as a hydrogen storage anode. The discharge electric current was 100 mA. Whenever the discharge voltage of the cell decreased to below 0.5 V, 1 g of $NaBH_4$ as a hydrogen fuel source was supplied for the solution of electrolyte, the continuous generation of current was monitored. The results are shown in FIG. 6. It can be seen from FIG. 6 that the fuel cell of the invention continuously generates current when the hydrogen-releasing agent was added to the electrolyte solution. That is, the fuel cell of the invention can generate current continuously by an electrochemical oxidation/reduction reaction as long as oxygen and hydrogen fuel are supplied.

What is claimed is:

1. A fuel cell comprising:

a) an aqueous alkaline solution of an electrolyte containing a hydrogen-releasing agent selected from the group consisting of $NaBH_4$, $KBH_4$, $LiAlH_4$, KH and NaH, b) a hydrogen storage alloy anode, and c) an oxygen cathode.

2. The fuel cell according to claim 1, wherein said alkaline electrolyte comprises KOH or NaOH.

3. The fuel cell according to claim 1 or 2, wherein said alkaline electrolyte further comprises LiOH.

4. The fuel cell according to claim 1 or 2, wherein said hydrogen-releasing agent is used in an amount of 0.01 to 50.00% by weight on the basis of the total weight of said alkaline solution of electrolyte.

5. The fuel cell according to claim 1, wherein said hydrogen storage alloy anode is selected from the group consisting of $AB_5$ Misch metallic alloy, an $AB_2$ Zirconium (Zr) alloy, and an $AB_2$ Titanium (Ti) alloy.

6. The fuel cell according to claim 1, wherein said oxygen cathode is a carbon electrode, a platinum-dispersed carbon electrode, or a nickel electrode.

* * * * *